(12) United States Patent
Shantharam et al.

(10) Patent No.: US 10,216,510 B2
(45) Date of Patent: Feb. 26, 2019

(54) SILENT UPGRADE OF SOFTWARE WITH DEPENDENCIES

(71) Applicant: AIRWATCH LLC, Atlanta, GA (US)

(72) Inventors: Shravan Shantharam, Atlanta, GA (US); Nikhil Ravishankar, Bangalore (IN); Ishan Srivastava, Bangalore (IN); Rene Jesus Olivera, Atlanta, GA (US); Saransh Bhatnagar, Bangalore (IN)

(73) Assignee: AIRWATCH LLC, Atlanta, GA (US)

( * ) Notice: Subject to any disclaimer, the term of this patent is extended or adjusted under 35 U.S.C. 154(b) by 17 days.

(21) Appl. No.: 15/269,997

(22) Filed: Sep. 20, 2016

(65) Prior Publication Data

US 2017/0351507 A1   Dec. 7, 2017

(30) Foreign Application Priority Data

Jun. 4, 2016  (IN) .............................. 201641019311

(51) Int. Cl.
*G06F 8/65* (2018.01)
*G06F 8/71* (2018.01)
*G06F 9/445* (2018.01)

(52) U.S. Cl.
CPC .................. *G06F 8/65* (2013.01); *G06F 8/71* (2013.01); *G06F 9/44505* (2013.01)

(58) Field of Classification Search
CPC ..................................... G06F 8/65; G06F 8/71

(Continued)

(56) References Cited

U.S. PATENT DOCUMENTS 6,959,320 B2 * 10/2005 Shah ......................... G06F 8/65
                                                          717/174
7,080,371 B1 *  7/2006 Arnaiz ...................... G06F 8/65
                                                          717/168

(Continued)

FOREIGN PATENT DOCUMENTS

WO     WO-2008042984 A2 *  4/2008  ............... G06F 8/65

OTHER PUBLICATIONS

Tyndall, "Building an Effective Software Deployment Process", Oct. 2012, ACM (Year: 2012).*

(Continued)

*Primary Examiner* — Wei Y Zhen
*Assistant Examiner* — Junchun Wu
(74) *Attorney, Agent, or Firm* — Thomas | Horstemeyer, LLP

(57) ABSTRACT

Disclosed are various examples for the silent upgrade of software and its dependencies on a client device. A client device can identify that a new version of the client application is available that upgrades a current version of the client application to the new version and download an installation package file for the new version of the client application. A unique identifier for the client application can be identified and used to search a registry of an operating system installed on the client device to locate information associated with the current version of the client application, such as a file path for the current version of the client application. The installation package file can be modified using information associated with the file path and a silent upgrade of the client application can be performed where the current version of the client application is upgraded with the new version of the client application without user interaction.

20 Claims, 6 Drawing Sheets

(58) Field of Classification Search
USPC .......................................................... 717/170
See application file for complete search history.

(56) References Cited

U.S. PATENT DOCUMENTS

| | | | | |
|---|---|---|---|---|
| 7,194,728 B1* | 3/2007 | Sirota | ...................... | G06F 8/658 |
| | | | | 717/176 |
| 8,209,564 B2* | 6/2012 | Vidal | ........................ | G06F 8/65 |
| | | | | 714/38.1 |
| 9,244,673 B2* | 1/2016 | Chinn | ........................ | G06F 8/65 |
| 2003/0188160 A1* | 10/2003 | Sunder | ...................... | G06F 8/65 |
| | | | | 713/165 |
| 2004/0060035 A1* | 3/2004 | Ustaris | ....................... | G06F 8/61 |
| | | | | 717/174 |
| 2007/0006219 A1* | 1/2007 | Sinha | ......................... | G06F 8/61 |
| | | | | 717/174 |
| 2008/0172664 A1* | 7/2008 | Nduaguba | ................. | G06F 8/61 |
| | | | | 717/174 |
| 2008/0201701 A1* | 8/2008 | Hofhansl | .................. | G06F 8/60 |
| | | | | 717/168 |
| 2010/0242033 A1* | 9/2010 | Fritsch | ....................... | G06F 8/65 |
| | | | | 717/171 |
| 2013/0125110 A1* | 5/2013 | Borkowski | ............... | G06F 8/61 |
| | | | | 717/174 |
| 2013/0138783 A1* | 5/2013 | Mallur | ....................... | G06F 8/63 |
| | | | | 709/221 |
| 2014/0068589 A1* | 3/2014 | Barak | ...................... | G06F 9/445 |
| | | | | 717/170 |
| 2014/0173578 A1* | 6/2014 | Ku | ............................ | G06F 8/67 |
| | | | | 717/169 |
| 2015/0178061 A1* | 6/2015 | Wang | ........................ | G06F 8/65 |
| | | | | 717/172 |
| 2015/0227354 A1* | 8/2015 | Wang | ........................ | G06F 8/61 |
| | | | | 717/170 |
| 2016/0077819 A1* | 3/2016 | Xin | ...................... | G06F 9/44521 |
| | | | | 717/174 |
| 2016/0132316 A1* | 5/2016 | Hu | ............................ | G06F 8/65 |
| | | | | 717/171 |
| 2016/0253170 A1* | 9/2016 | Fardig | ....................... | G06F 8/68 |
| | | | | 717/170 |
| 2016/0335070 A1* | 11/2016 | Aw | ............................ | G06F 8/65 |
| 2016/0378458 A1* | 12/2016 | Pan | ...................... | G06F 11/1433 |
| | | | | 717/169 |
| 2017/0104789 A1* | 4/2017 | Cudak | ...................... | H04L 63/20 |

OTHER PUBLICATIONS

Keller et al. "Dynamic Dependencies in Application Service Management", May 2000, IBM (Year: 2000).*

Coupaye et al., "Foundations of Enterprise Software Deployment", Mar. 2000, IEEE (Year: 2000).*

Betz et al., "Implementing Continuous Integration Software in an Established Computational Chemistry Software Package", 2013, IEEE (Year: 2013).*

* cited by examiner

SILENT UPGRADE OF SOFTWARE WITH DEPENDENCIES

RELATED APPLICATION

Benefit is claimed under 35 U.S.C. 119(a)-(d) to Foreign Application Serial No. 201641019311 filed in India entitled "SILENT UPGRADE OF SOFTWARE WITH DEPENDENCIES", filed on Jun. 4, 2016, by AIRWATCH LLC, which is herein incorporated in its entirety by reference for all purposes.

BACKGROUND

With the emergence of bring-your-own-device (BYOD) technology in the workplace, an enterprise can permit its employees to use their own devices to access enterprise data, such as email and corporate documents. However, prior to an employee using his or her own device in the workplace, the enterprise can require the employee to enroll with a device management service capable of protecting enterprise data from theft, data loss, and unauthorized access.

Particular operating systems offer device management capabilities that allow an administrator, such as one associated with an enterprise, to remotely manage the configuration of a device. For example, an administrator of an enterprise can remotely install applications or other data on an employee's device. Some operating systems permit these applications to be "silently" downloaded and installed on a user's device where the user is unaware of the installation as no user interfaces are generated, and because no user interaction is required. However, depending on the level of upgrade, silently upgrading an application from one version to another may be problematic.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIG. 3 is a drawing of a registry editor application that contains information for a registry of an operating system.

DETAILED DESCRIPTION

Figure 1:
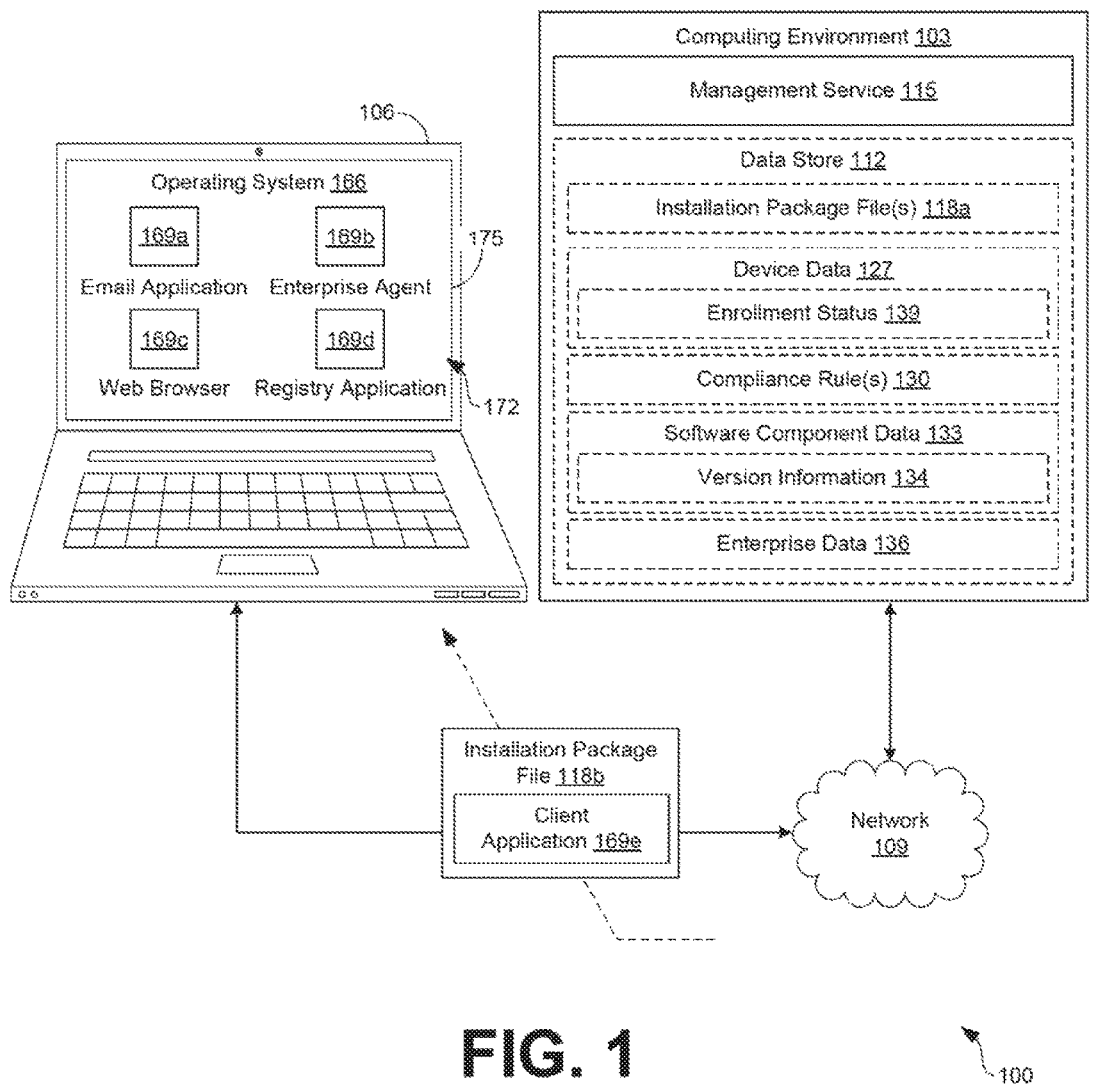
FIG. 1 is a drawing of a networked environment including a management service and a client device.

The present disclosure relates to silently upgrading software applications and their dependencies on client devices. Various operating systems, such as Microsoft Windows® 10, offer device management capabilities that allow an administrator to remotely configure a managed device, such as a laptop, smartphone, tablet, or other similar device. In one example, an administrator of an enterprise can remotely install applications on an employee's device. Some operating systems permit these applications to be performed "silently"—or downloaded and installed on a user's device where the user is unaware of the installation as no user interfaces are generated and no user interaction is required.

Default configurations of Microsoft Windows® 10 can include a device management protocol specified by the Open Mobile Alliance (OMA) Device Management (DM) Working Group, referred to herein as OMA-DM, which offers mobile device management (MDM) functionality on the device. For example, the OMA-DM protocol permits an administrator to silently install applications on the client device. Typically, an application is formatted as an installation package file format capable of being recognized by the operating system. In some examples, the installation package file is a Microsoft Installer (MSI) file or Windows Installer file capable of being recognized by the Microsoft Windows® operating system. However, the default configurations of a device using Microsoft Windows® and similarly configured operating systems can include various limitations.

Microsoft Windows® 10, for example, distinguishes between "minor" upgrades and "major" upgrades. Minor upgrades require the name of an MSI file for an upgrade to be kept the same as the MSI file for the previous version, or the MSI file for the upgrade is required to be launched from the same physical location of the MSI file for the previous version. If either one of these conditions is not met, a silent upgrade of an application or its dependencies fails. Major upgrades require an older version of the application to be first uninstalled before installing a newer version. This can be undesirable as application data is not retained on the device after the older version is uninstalled. An upgraded version of an application would not be able to access previously stored application data.

Further, the name of the installation package file cannot be specified by an administrator utilizing the OMA-DM protocol. For example, the default functionality of the OMA-DM protocol for downloading an application includes storing it in a directory or as a filename generated using a randomly-generated unique device identifier (UDID). Hence, after installing an application through the OMA-DM client, any minor upgrade initiated by the user fails because the name of the MSI file for the upgrade is not the same as the previous version, or is not stored in the same folder as the previous version. A major upgrade is necessary where the product code of the application has changed; however, this results in loss of application data as the previous version of the application is uninstalled prior to installation of a newer version.

According to various examples described herein, an application can perform silent upgrades of software or its dependencies on an operating system of the client device in conformance with predefined parameters and despite the limitations of OMA-DM and similar protocols. Once an application is installed on a device, the application can identify that an upgrade or a new version of the application is available.

The application can then download an installation package file that includes an upgrade or a new version of the application. The application can identify information to rename the installation package file such that the upgrade does not fail or, alternatively, can move the installation package file to an appropriate directory permitted by the OMA-DM protocol. In one example, the application can access the registry of an operating system installed on the client device using a unique identifier, such as a product code, for the application.

A file path can be identified from the registry for the currently-installed version of the application. A silent upgrade of the client application can be performed on the client device from the current version to the new version using information associated with the file path. For example, the application can rename the installation package file to match another installation package file that was used to install the current version or a previous of the application. Further, the application can communicate with a remote computing environment to identify required dependencies, verify that the client device is in compliance with one or more compliance rules, verify that the client device is enrolled with a management service, and update an enrollment status associated with the device. As a result, applications can be upgraded silently, along with their required dependencies, as will be discussed in detail below.

With reference to FIG. 1, shown is an example of a networked environment 100. The networked environment 100 can include a computing environment 103 and a client device 106 in communication with one other over a network 109. The network 109 can include, for example, the Internet, intranets, extranets, wide area networks (WANs), local area networks (LANs), wired networks, wireless networks, other suitable networks, or any combination of two or more such networks. For example, the networks can include satellite networks, cable networks, Ethernet networks, telephony networks, and other types of networks.

The computing environment 103 can include, for example, a server computer or any other system providing computing capability. Alternatively, the computing environment 103 can include a plurality of computing devices that are arranged, for example, in one or more server banks, computer banks, or other arrangements. The computing environments 103 can include a grid computing resource and/or any other distributed computing arrangement. The computing devices can be located in a single installation or can be distributed among many different geographical locations. The computing environments 103 can also include or be operated as one or more virtualized computer instances. For purposes of convenience, the computing environment 103 is referred to herein in the singular. Even though the computing environment 103 is referred to in the singular, it is understood that a plurality of computing environments 103 can be employed in the various arrangements as described above.

The data store 112 can include memory of the computing environment 103, mass storage resources of the computing environment 103, or any other storage resources on which data can be stored by the computing environment 103. The data stored in the data store 112, for example, can be associated with the operation of the various applications and/or functional entities described below.

The components executed on the computing environment 103 can include, for example, a management service 115 as well as other applications, services, processes, systems, engines, or functionality not discussed in detail herein. The management service 115 can be executed to oversee the operation of multiple client devices 106. In some embodiments, an enterprise, such as one or more companies or other organizations, can operate the management service 115 to oversee or manage the operation of the client devices 106 of its employees, contractors, customers, or other users having user accounts with the enterprise.

The management service 115 can manage the installation of various software components on the client device 106 using one or more installation package files 118a and 118b (collectively installation package files 118). Such software components can include, for example, client applications, libraries, drivers, device configurations, or other similar components that can require installation on the client device 106. In one example, the management service 115 can generate and communicate MSI files to the client device that, when received, cause installation of the software components designated therein.

The management service 115 can interact with one or more client applications executed on the client device 106 to enroll the client device 106 with the management service 115. As a result, the management service 115 can verify that configuration and operation of the client device 106 is in conformance with predefined criteria that ensures that enterprise data, or other data, is protected from data loss, unauthorized access, or other harmful event. The management service 115 can further serve up enterprise data to the client device 106.

The data stored in the data store 112 can include, for example, installation package files 118, device data 127, compliance rules 130, software component data 133, enterprise data 136, as well as other data. In some examples, installation package files 118 are MSI installation package files used by the Microsoft Windows® operating system. However, in other examples, the installation package files 118 can include other formats. The device data 127 can include information associated with one or more client devices 106. In one example, the management service 115 can oversee or manage one or more client devices 106 enrolled with the management service 115. To this end, the management service 115 can maintain an enrollment status 139 for each of the client devices 106 to identify those client devices 106 enrolled with the management service 115.

In one example, a client device 106 designated as "enrolled" can be permitted to access the enterprise data 136 while a client device 106 designated as "not enrolled" or having no designation can be denied access to the enterprise data 136. Additionally, the management service 115 can require certain software components to be installed on the client device 106 before the client device 106 can access various information, such as the enterprise data 136. In one example, the management service 115 can require the client device 106 to have a certain version of a client application installed thereon before providing access to the enterprise data 136.

The data store 112 can include additional constraints that must be satisfied for enterprise data 136 to become accessible to a client device 106. For example, the compliance rules 130 can include predefined constraints that must be met in order for the management service 115, or other application, to permit access to the enterprise data 136. In some examples, the management service 115 communicates with one or more client applications executable on the client device 106 to determine whether vulnerabilities exist on the client device 106 that do not satisfy the compliance rules 130. Vulnerabilities can include, for example, the presence of a virus or malware on the client device 106, the client device 106 being "rooted" or "jailbroken" where root access is provided to a user of the client device 106, the presence of particular applications or files, questionable device configurations, vulnerable versions of client applications, or other vulnerability as can be appreciated.

Software component data 133 can include applications, libraries, drivers, scripts, files, or similar components that may require installation on one or more client devices 106. As can be appreciated, the software component data 133 can include version information 134 for various applications, libraries, drivers, scripts, file types, or other components capable of installation on different operating systems, types of client devices 106, or other variables. The enterprise data 136 can include, for example, documents, emails, and other data hosted or maintained by an enterprise or other entity.

The client device 106 can be representative of one or more client devices 106. The client device 106 can include a processor-based system, such as a computer system, that can include a desktop computer, a laptop computer, a personal digital assistant, a cellular telephone, a smartphone, a set-top box, a music player, a tablet computer system, a game console, an electronic book reader, or any other device with like capability. The client device 106 can also be equipped with networking capability or networking interfaces, including a localized networking or communication capability, such as a near-field communication (NFC) capability, radio-frequency identification (RFID) read or write capability, or other localized communication capability.

The client device 106 can include an operating system 166 configured to execute various client applications 169a . . . 169e (collectively client applications 169). Some client applications 169 can access network content served up by the computing environment 103 or other servers, thereby rendering a user interface 172 on a display 175, such as a liquid crystal display (LCD), touch-screen display, or other type of display device. To this end, some client applications 169 can include a browser or a dedicated application, and a user interface can include a network page, an application screen, or other interface. Further, other client applications 169 can include device management applications, enterprise applications, social networking applications, word processors, spreadsheet applications, media viewing application, or other applications.

Next, a general description of the operation of the various components of the networked environment 100 is provided. As can be appreciated, a client application 169 installed on a client device 106 can be described as a software version, such as Version 1.0. Security vulnerabilities are often discovered in older versions of a client application 169, thus, it is beneficial to have the client device 106 perform an upgrade from the previous version, such as Version 1.0, to a new version, such as Version 2.0.

Current limitations in OMA-DM and similar protocols prevent upgrades from being performed silently where no user interaction is required. For example, the default functionality of the OMA-DM protocol for downloading a client application 169 includes downloading the installation package file 118 to a randomly-generated directory or assigning the installation package file 118 a randomly-generated filename. After installing the client application 169 through the OMA-DM client, any minor upgrades would fail because the name of the installation package file 118 for the upgrade is not the same as the previous version, or is not stored in the same folder as the previous version. Major upgrades, on the other hand, can be undesirable as any software data, such as login information, emails, corporate documents, or other similar data, is removed along with the previous version.

To this end, a client application 169 can be configured to perform silent upgrades of software or its dependencies on an operating system 1699 of the client device 106 in conformance with compliance rules 130 and despite the limitations of OMA-DM and similar protocols. Using the management service 115, an administrator or a user of the client device 106 can install a clean copy of a client application 169 on the client device 106, referred to herein as a first install or base installation. The management service 115 can generate an installation package file 118 that includes the client application 169 and its dependencies, such as libraries required by the client application 169 to be installed on the client device 106 for the client application 169 to perform as intended by its developers. The base installation can be performed as described in U.S. patent application Ser. No. 15/083,620 entitled "SILENT INSTALLATION OF SOFTWARE WITH DEPENDENCIES," filed on Mar. 29, 2016, which is incorporated by reference herein in its entirety.

Software dependencies for a client application 169 can include, for example, C libraries, C++ libraries, Open Graphic Library (OpenGL) libraries, Microsoft® ActiveX libraries, Visual Basic (VB) libraries, or other software components that require installation for the client application 169 to perform in accordance with its intended functionality when executing on the client device 106. In scenarios where the client application 169 includes a video game, the software dependencies can include graphics libraries, such as OpenGL or Microsoft® DirectX libraries, which are invoked by the source code or object code of the client application 169.

During the base installation, the operating system 166, via the OMA-DM protocol, downloads the installation package file 118 to a randomly-generated directory and assigns the installation package file 118 a randomly-generated filename. Once installed on the client device 106, the client application 169 can be configured to identify that an upgrade or a new version of the client application 169 is available having a release date more recent than a current version. In some examples, this can be performed automatically when the client device 106 is powered on, when the client application 169 is executed, or in response to another suitable event. In other examples, through a user interface of the client application 169 or the operating system 166, the user can manually select a component that checks to see if an upgrade or newer version of the client application 169 is available.

After identifying that an upgrade or new version is available, the client application 169 (or the operating system 166) can download an installation package file 118 that includes an upgrade or a new version of the client application 169. However, the installation package file 118 assumes a randomly-generated filename. If an installation is attempted using the installation package file 118 assuming a randomly-generated filename or stored in a randomly assigned directory, the upgrade will fail based on the limitations of the operating system 166 and the OMA-DM protocol. For example, if the filename of the installation package file 118 for the upgrade is not the same as the filename of the installation package file 118 for the base installation, the upgrade will fail.

To circumvent these limitations, the client application 169 can be configured to identify information to rename the installation package file 118 such that the upgrade does not fail or, alternatively, can move the installation package file 118 to an appropriate directory permitted by the OMA-DM protocol. In one example, the client application 169 can access the registry of an operating system 166 installed on the client device 106 to identify what the installation package file 118 should be renamed or a location where the installation package file 118 should be moved. The client application 169 can query the registry using a unique identifier, such as a product code, to locate information pertaining the client application 169 stored in the registry.

Using the unique identifier, the client application 169 can verify that the upgrade or new version of the client application 169 corresponds to the same client application 169. For example, a product code for the installed version of the client application 169 can be compared to a product code for the installation package file 118 having the new version of the client application 169. If the product codes match, it can be assumed that the information obtained from this portion of the registry is reliable for renaming or moving the installation package file 118. The portion of the registry corresponding to the client application 169 can include a folder in a hierarchical file system, a node in a data structure, or similar data type.

From the portion of the registry having information for the client application 169, the client application 169 can identify the directory and filename for the installation package file 118 used in the base installation of the client application 169. In other words, the filename of the installation package file 118 used to install the initial version of the client application 169 can be identified as well as the directory in which it is stored.

After the filename is obtained, the newly-downloaded installation package file 118 can be renamed and a default installer application on the operating system 116 can be called to perform the silent upgrade of the new version of the client application 169. In combination with or alternatively, the newly-downloaded installation package file 118 can be stored in the same directory at the installation package file 118 used in the base installation. The client application 169 can then call a default installer application on the operating system 116 to perform the silent upgrade of the new version of the client application 169. In some examples, a command line can be generated that ensures the installation is performed without uninstalling the previous version of the client application 169. In other examples, a command line is generated that causes the installer application to uninstall the older version of the client application 169.

In further examples, the client application 169 can communicate with the computing environment 103 to identify required dependencies, verify that the client device 106 is in compliance with one or more compliance rules 130, verify that the client device 160 is enrolled with the management service 115, and update an enrollment status associated with the client device 106 after an upgrade has been installed. As a result, client applications 169 can be upgraded silently, along with their required dependencies.

Figure 2:
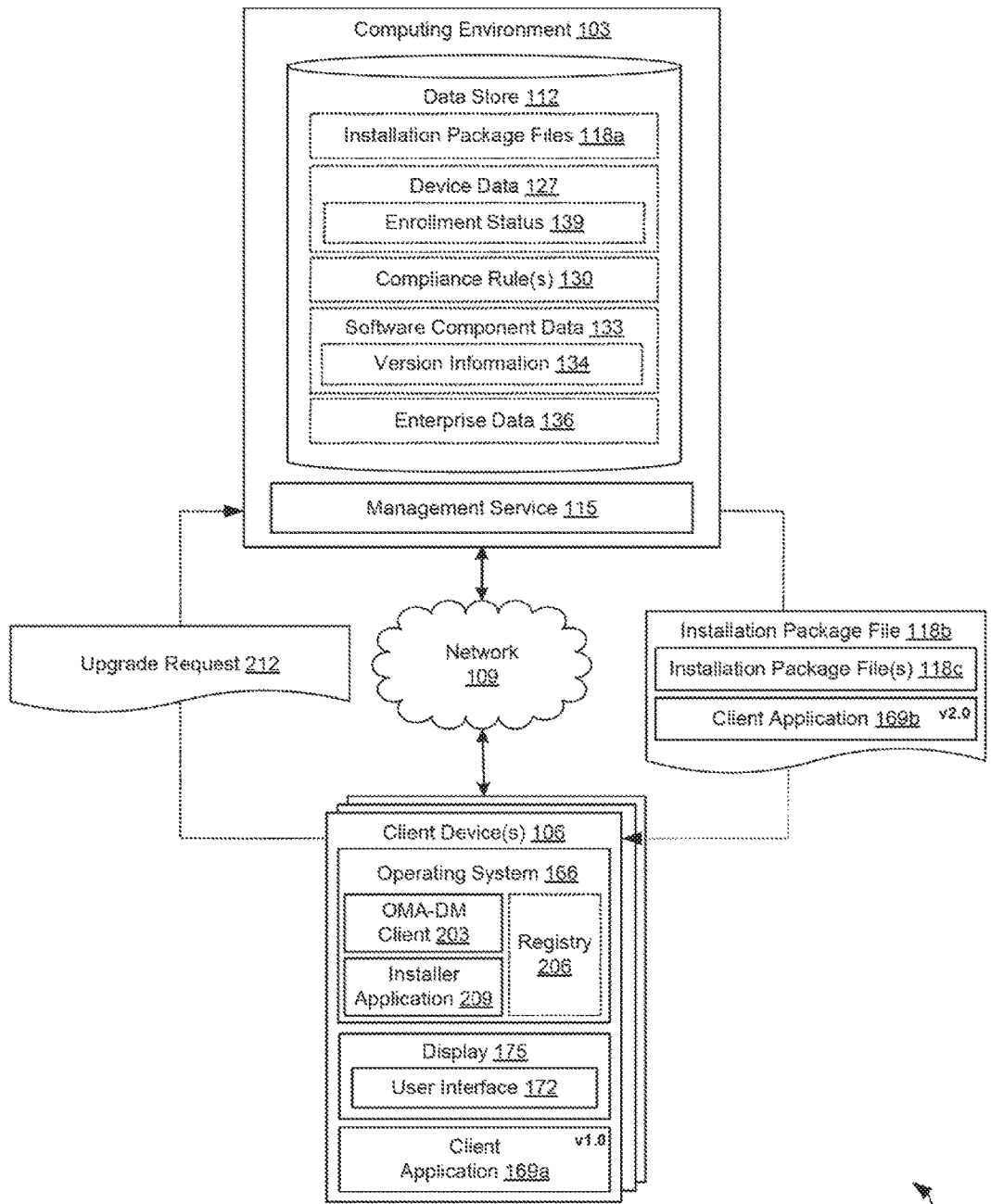
FIG. 2 is another drawing of the networked environment including the management service and the client device.

Moving on to FIG. 2, shown is another example of the networked environment 100. The client device 106 can comprise one or more OMA-DM clients 203 that implement the OMA-DM protocol. Although the OMA-DM client 203 is shown as a component of the operating system 166, in other examples, the OMA-DM client 203 can be independent from the operating system 166. The operating system 166 can include a registry 206. In some examples, the registry 206 can include a hierarchical database that stores settings for the operating system 166 and applications that choose to store data in the registry 206.

The operating system 166 can further include an installer application 209. In examples where the operating system 166 includes Microsoft Windows®, the installer application 209 can include MSIEXEC. To cause an installation package file 118 to be installed on the client device 106, the client application 169 or the operating system 116 can programmatically call the installer application 209 using a command line, such as:

msiexec /s agent-application-package-file-version-1.msi, where the flag "/s" causes msiexec.exe to perform a silent installation using the installation package file 118 labeled "agent-application-package-file-version-1.msi." Additionally, the OMA-DM client 203 can perform installations of installation package files 118.

During a first install of a client application 169 on the client device 106, the OMA-DM client can download one of the installation package files 118a . . . 118c that includes the client application 169. The OMA-DM client 203 can store the installation package file 118 in a randomly-generated directory and assign the installation package file 118 a randomly-generated filename.

Once installed on the client device 106, the client application 169 can generate an upgrade request 212 to identify that an upgrade or a new version of the client application 169 is available more recent than a current version by sending an upgrade request 212. In some examples, the upgrade request 212 can be sent to the computing environment 103 automatically when the client device 106 is powered on, when the client application 169 is executed, or in response to another suitable event. In other examples, through a user interface 172 of the client application 169 or the operating system 166, the user can manually select a component that checks to see if an upgrade or newer version of the client application 169 is available. If an upgrade is available, such as when a new version of the client application 169 is released, the client application 169 can download the installation package file 118 from the computing environment 103. The installation package file 118 can include other installation package files 118, such as installation package files 118 that install software dependencies or other applications.

In further examples, the client application 169 can communicate with the management service 115 to verify that the client device 106 is in compliance with one or more compliance rules 130. For example, if the client application 169 detects a setting, a file, a performed event, or other instance on the client device 106 that is not in conformance with a compliance rule 130, the client application 169 can abstain from providing access to enterprise data on the client device 106. Such vulnerability can include, for example, the presence of a virus or malware on the client device 106, the client device 106 being "rooted" or "jailbroken" where root access is provided to a user of the client device 106, or other vulnerability as can be appreciated. In another example, the computing environment 103 can abstain from providing access to enterprise data on the client device 106 until an upgrade is performed that causes the client device 106 to come into conformance with the compliance rules 130.

In some examples, the client application 169 can communicate with the management service 115 to verify that the client device 106 is enrolled with the management service 115. In some examples, upon the successful upgrade of the client application 169 or other software component on the client device 106, the management service 115 can update the enrollment status 139 of the client device 106 to reflect the currently installed version such that certain functionality can be permitted on the client device 106, such as accessing enterprise data 136. In further examples, the computing environment 103 can verify that all features of the new version of the client application 169 are operating as intended prior to updating the enrollment status 139 for a client device 106.

Figure 3:
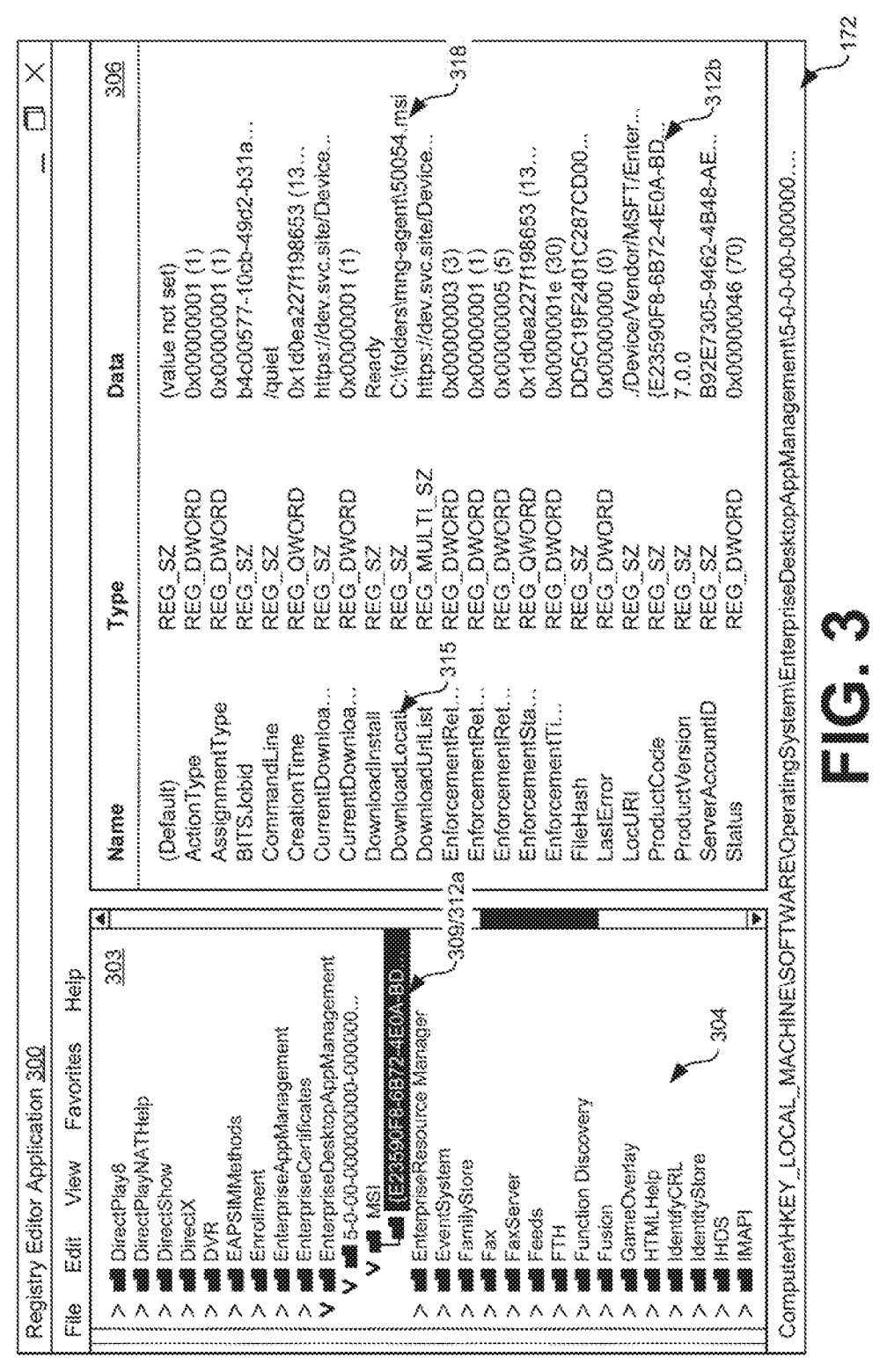

With reference to FIG. 3, shown is an example of a user interface 172 for a registry editor application 300. While the client application 169 can access information from the registry 206 of the operating system 166 programmatically, the registry editor application 300 is provided herewith to illustrate the information stored in the registry 206 after a base installation of a client application 169 has been performed.

The registry 206 can include a hierarchical database that stores settings for the operating system 166 and applications that choose to store data in a single repository in a standardized format. A first window 303 of the registry editor application 300 can include a taxonomy 304 that allows a user to navigate and dial down particular folders in a hierarchical fashion. A second window 306 of the registry editor application 300 displays information stored in the registry 206 for a node 309 selected in the taxonomy 304.

During a first install of a client application 169, the OMA-DM client 203 can store information associated with the client application 169 in the registry 206. For example, information associated with a client application 169 can be stored in the node 309 having a label of a product code 312a . . . 312b that uniquely identifies the client application 169. During an upgrade, the client application 169 can query the registry 206 using the product code 312. For example, the client application 169 can generate a command line that searches the registry 206 for a product code for the client application 169 via:

REG QUERY [ROOT\]ProductCode /v E23590 . . . [/s], where "[ROOT\]" is the folder to be searched, "ProductCode" is the key or variable name, and "E23590 . . . " is the value of the product code 312 used in the query.

When a resulting node 309 in the registry 206 is located, the information associated with that node 309 can be obtained. In one example, the DownloadLocation field 315 can be identified to obtain the file path 318 for the installation package file 118 used in the base installation. An example of a file path 318 is shown in FIG. 3 as:

C:\folders\mng-agent\50054.msi.

As the location and the filename of the installation package file 118 ("50054.msi") is created by the OMA-DM client 203 (and not configurable by a developer of the client application 169), the filename and directory location cannot be obtained without consulting the registry 206. When the installation package file 118 having a new version of the client application 169 is downloaded on the client device 106, the installation package file 118 can be renamed to "50054.msi" and stored in "C:\folders\mng-agent" to bypass restrictions created by the OMA-DM protocol and perform a silent upgrade of the client application 169.

Figure 4:
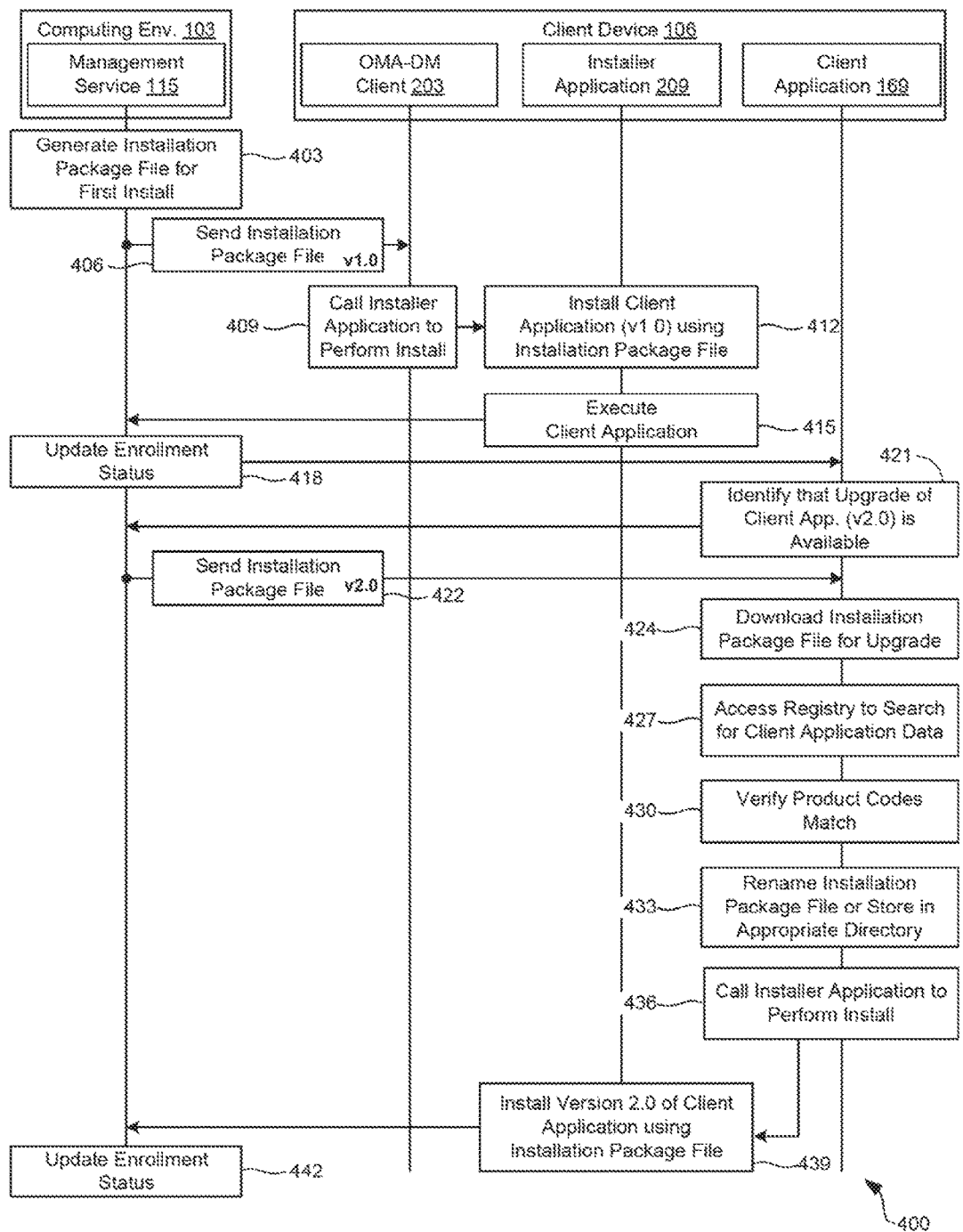
FIG. 4 shows a sequence diagram illustrating an example of component interaction in the networked environment.

With reference to FIG. 4, shown is a sequence diagram 400 illustrating example interactions of components in the networked environment 100. The sequence diagram of FIG. 4 illustrates an example of the management service 115 causing a silent upgrade of a client application 169 and its dependencies on a client device 106. The dependencies can include, for example, other applications, libraries, drivers, scripts, files, or other software components.

Using the management service 115, an administrator or a user of the client device 106 can install a clean copy of a client application 169 on the client device 106, referred to as a first install or base installation. In step 403, the management service 115 can generate an installation package file 118 that includes the client application 169 and its dependencies, such as libraries required by the client application 169 to be installed on the client device 106 for the client application 169 to perform as intended by its developers. In step 406, the installation package file 118 is communicated to the client device 106 for installation.

Next, the OMA-DM client 203 downloads the installation package file 118 on the client device 106 and stores the installation package file 118 in a randomly-generated directory and assigns the installation package file 118 a randomly-generated filename. In step 409, the OMA-DM client 203 calls the installer application 209 to perform the first install of the client application 169. In step 412, the installer application 209 uses the installation package file 118 to install the client application 169. Thereafter, in step 415, the installer application 209 causes the operating system 166 to execute the client application 169. After installation, in step 418, the enrollment status 139 can be updated to reflect the current version of the client application 169 installed on the device. In other examples, the enrollment status 139 can be updated after a user of the client device 106 creates an account in the client application 169 or logs in with suitable credentials.

In step 421, the client application 169 can identify that an upgrade or a new version of the client application 169 is available, such as a version released more recent than a current version installed on the client device 106, by communicating with the computing environment 103. After identifying that an upgrade or new version is available, in step 422, the computing environment 103 can send the installation package file 118 having the new version of the client application 169 to the client device 106. In step 424, the client application 169 can download an installation package file 118 that includes an upgrade or a new version of the client application 169. However, the installation package file 118 assumes a filename randomly-generated by the OMA-DM client 203. If an installation were to be attempted using the installation package file 118 assuming a randomly-generated filename or stored in a randomly assigned directory, the upgrade will fail based on the limitations of the operating system 166 and the OMA-DM protocol. For example, if the filename of the installation package file 118 for the upgrade is not the same as the filename of the installation package file 118 for the base installation, the upgrade will fail.

Accordingly, in step 427, the client application 169 can access the registry 206 of the operating system 166 to search for information associated with the client application 169 using a unique identifier, such as a product code 312. In one example, the client application 169 can query the registry using the product code 312 from the installation package file 118 having the new version of the client application 169 to identify information pertaining to the current version of the client application 169 stored in the registry 206.

In step 430, the client application 169 can verify that the product code 312 for the current version and the new version of the client application 169 match. If the product codes match, it can be assumed that the information obtained from this portion of the registry is reliable for renaming or moving the installation package file 118 having the new version of the client application 169. From the registry 206, the client application 169 can identify the file path 318, which includes the directory and filename for the installation package file 118 used in the first install of the client application 169.

After the filename is obtained, in step 433, the newly-downloaded installation package file 118 can be renamed to that of the installation package file 118 for the base install, or the installation package file 118 can be relocated to the directory identified in the registry 206. In step 436, the installer application 209 can be called to perform the silent upgrade of the new version of the client application 169 using the recently-downloaded installation package file 118. In step 439, the installer application 209 can perform the silent upgrade of the new version of the client application 169.

In some examples, a command line can be generated that ensures the installation is performed without uninstalling the previous version of the client application 169. In other examples, a command line is generated that causes the installer application to uninstall the older version of the client application 169. As Microsoft Windows® and similarly configured operating systems distinguish between minor and major upgrades, through the examples provided herein, minor silent upgrades of installation package files 118, such as MSI files, are possible without the necessity of user intervention. In step 442, the enrollment status 139 can be updated to reflect that the upgrade has been successfully performed in the client device 106.

Figure 5:
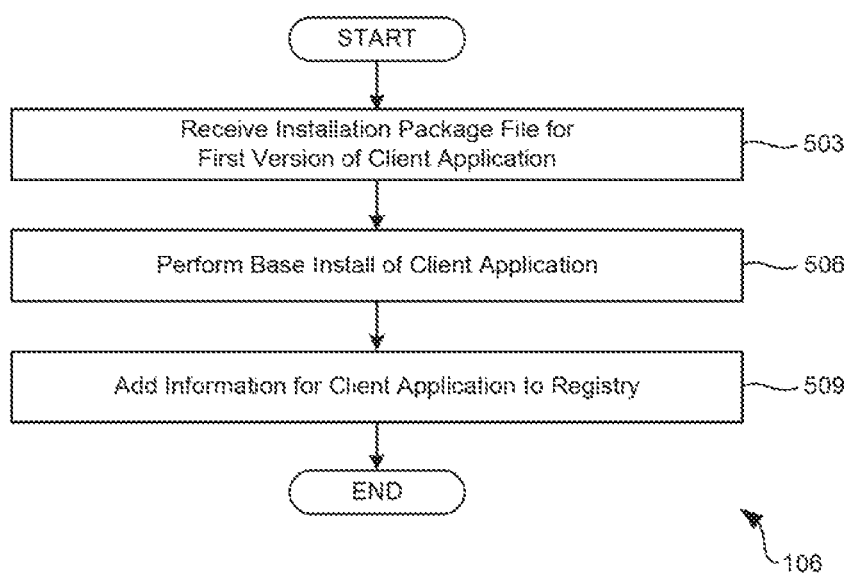
FIG. 5 is a flowchart illustrating functionality implemented by components of the networked environment.

Referring next to FIG. 5, shown is a flowchart that provides one example of the operation of a portion of the client device 106 performing a first install of a client application 169. As an alternative, the flowchart of FIG. 5 can be viewed as depicting an example of elements of a method implemented by the OMA-DM client 203 according to one or more embodiments. The separation or segmentation of functionality as discussed herein is presented for illustrative purposes only.

In step 503, an installation package file 118 is obtained from the computing environment 103 having a first version of a client application 169, such as version 1.0. Next, in step 506, the installer application 209 can be called to perform a first install of the client application 169. In other words, version 1.0 of the client application 169 is installed on the client device 106. After the client application 169 is installed, in step 509, the registry 206 can be updated to add information pertaining to the client application 169. As will be discussed, the registry 206 can be queried during an upgrade to rename or relocate an installation package file 118 such that the upgrade can be performing silently on the client device 106. Thereafter, the process can proceed to completion.

Figure 6:
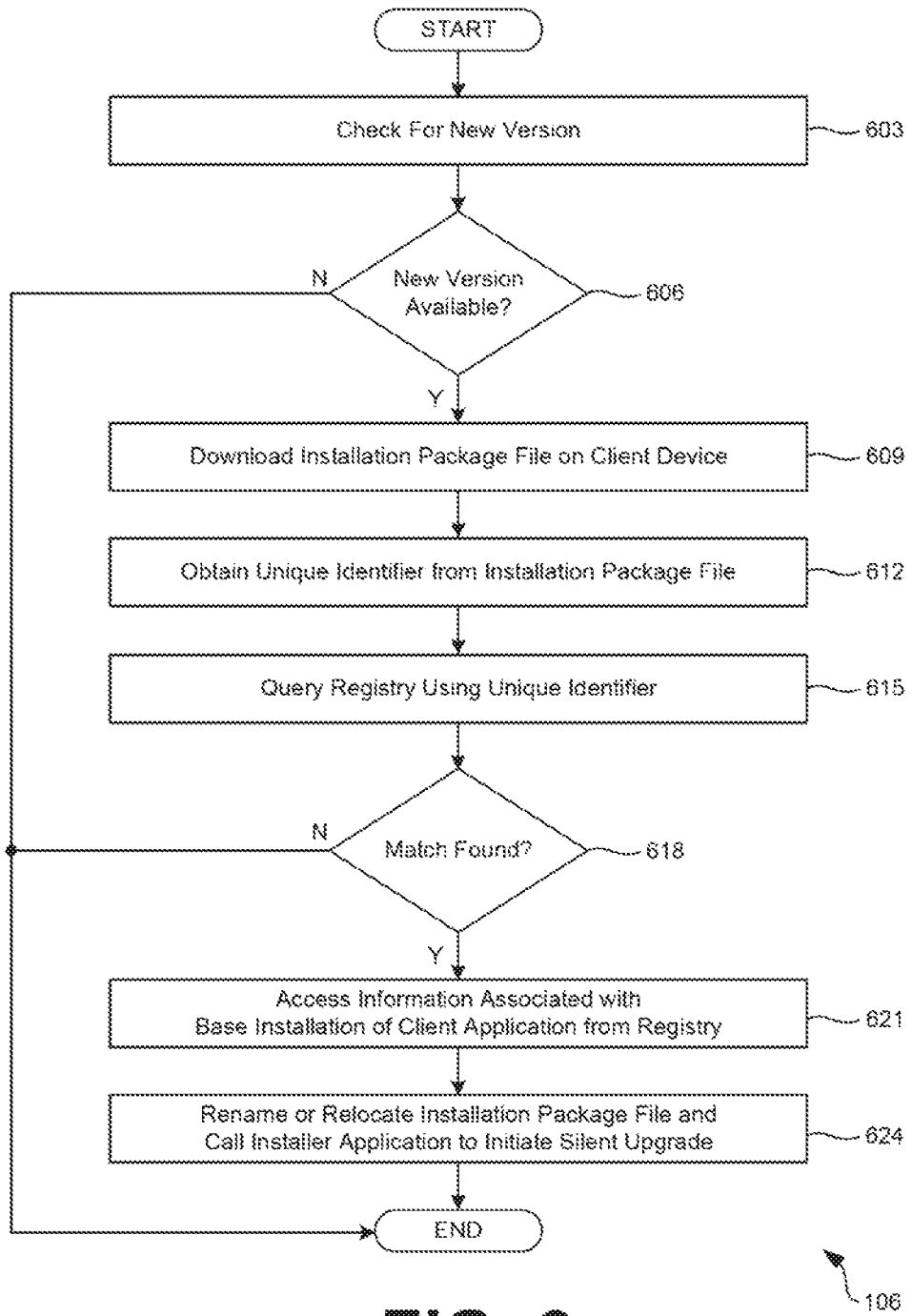
FIG. 6 is a flowchart illustrating functionality implemented by components of the networked environment.

Moving on to FIG. 6, shown is a flowchart that provides one example of the operation of a portion of the client device 106. The flowchart of FIG. 6 can be viewed as depicting an example of elements of a method implemented by an operating system of the client device 106 or a client application 169 executable on the client device 106 according to one or more examples. The separation or segmentation of functionality as discussed herein is presented for illustrative purposes only.

After a base installation of a client application 169 is performed through the OMA-DM client 203, any minor upgrades would fail because the name of the installation package file 118 for the upgrade is not the same as the previous version, or is not stored in the same folder as the previous version. Major upgrades, on the other hand, can be undesirable as any software data, such as login information, emails, corporate documents, or other similar data, is removed along with the previous version. Hence, the client application 169 can be configured to perform silent upgrades of software or its dependencies on an operating system 1699 of the client device 106 in conformance with compliance rules 130 and despite the limitations of OMA-DM and similar protocols.

Beginning with step 603, once the first install of the client application 169 is performed on the client device 106, the client device 106 can communicate with the computing environment 103 to check whether an upgrade or a new version of the client application 169 is available. In some examples, this can be performed automatically when the client device 106 is powered on, when the client application 169 is executed, or in response to another suitable event. In other examples, a user can manually select a component that checks to see if an upgrade or newer version of the client application 169 is available, for example, through a suitable user interface 172.

In step 606, it is determined whether a new version of the client application 169 is available for download and installation. If no new version is available, the process can proceed to completion. If a new version is available, the process can proceed to step 609 to download an installation package file 118 on the client device 106 that includes the new version of the client application 169. However, the installation package file 118 including the new version of the client application 169 assumes a randomly-generated filename assigned by the OMA-DM client 203. If an installation is attempted using the installation package file 118 assuming a randomly-generated filename or stored in a randomly assigned directory, the upgrade will fail based on the limitations of the operating system 166 and the OMA-DM protocol. For example, if the filename of the installation package file 118 for the upgrade is not the same as the filename of the installation package file 118 for the base installation, the upgrade will fail.

To circumvent these limitations, the client application 169 can use information from the registry 206 to rename the installation package file 118 such that the upgrade does not fail or, alternatively, can move the installation package file 118 to an appropriate directory permitted by the OMA-DM protocol. Accordingly, in step 612, a unique identifier is obtained from the installation package file 118 that includes the new version of the client application 169. In one example, the unique identifier includes a product code 312 unique to the client application 169 (regardless of version). The product code 312 can be obtained from a property table included in the installation package file 118.

Thereafter, in step 615, the registry 206 is queried using the product code 312. In step 618, the client device 106 can determine whether a match has been located using the unique identifier in a query. If no match is found, it can be assumed that a previous version of the client application 169 is not installed on the client device 106 and the process can proceed to completion. If a match is found, the process can proceed to step 621 where information associated with the base installation of the client application 169 can be accessed from the registry 206. From the portion of the registry 206 having information for the client application 169, the client application 169 can identify the directory and filename for the installation package file 118 used in the base installation of the client application 169 from the file path 318.

After the filename and directory is obtained from the file path 318, in step 624, the newly-downloaded installation package file 118 can be renamed the same as the installation package file 118 used in the base installation, or relocated to the same directory as the installation package file 118 used in the base installation, and silently installed by calling the installer application 209. In some examples, the client application 169 can generate a command line that ensures the installation is performed without uninstalling the previous version of the client application 169. In other examples, a command line is generated that causes the installer application to uninstall the older version of the client application 169.

The client devices 106 or devices comprising the computing environment 103 can include at least one processor circuit, for example, having a processor and at least one memory device, both of which are coupled to a local interface, respectively. The device can include, for example, at least one computer, a mobile device, smartphone, computing device, or like device. The local interface can include, for example, a data bus with an accompanying address/control bus or other bus structure.

Stored in the memory device are both data and several components that are executable by the processor. In particular, stored in the one or more memory devices and executable by the device processor can be the client application 169, and potentially other applications. Also stored in the memory can be a data store 112 and other data.

A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. Also, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

The client devices 106 can include a display 175 upon which a user interface 269 generated by the client application 169 or another application can be rendered. In some examples, the user interface 269 can be generated using user interface data provided by the computing environment 103. The client device 106 can also include one or more input/output devices that can include, for example, a capacitive touchscreen or other type of touch input device, fingerprint reader, or keyboard.

Although the management service 115, the client application 169, and other various systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The sequence diagram and flowcharts show an example of the functionality and operation of an implementation of portions of components described herein. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the sequence diagram flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the drawings can be skipped or omitted.

Also, any logic or application described herein that includes software or code can be embodied in any non-transitory computer-readable medium for use by or in connection with an instruction execution system such as, for example, a processor in a computer system or other system. In this sense, the logic can include, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

It is emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure.

What is claimed is:

1. A non-transitory computer-readable medium embodying program instructions executable in a client device for performing a silent upgrade of a first client application on the client device that, when executed, cause the client device to:

identify, by a second client application, that a new version of the first client application is available that upgrades a current version of the first client application to the new version, wherein the new version is required for a state of the client device to be in compliance with at least one compliance rule;

download, by the second client application, an installation package file for the new version of the first client application;

search, by the second client application, a registry of an operating system installed on the client device using a unique identifier identified for the first client application to locate information associated with the current version of the first client application in the registry;

identify, by the second client application, a file path for the current version of the first client application from the registry;

modify, by the second client application, the installation package file using the information in the registry, wherein the installation package file is modified by performing:

renaming a file name of the installation package file to be the same as a name of an initial installation package file used to install the first client application; and moving the installation package file to a directory in the file path of the current version of the first client application; and generate and execute, by the second client application, a command line query that causes a default installer application executable on the client device to perform a silent upgrade of the first client application, wherein the silent upgrade comprises replacing the current version of the first client application with the new version of the first client application without user interaction.

2. The non-transitory computer-readable medium of claim 1, wherein the file path is a download location used during a base installation of the current version of the first client application.

3. The non-transitory computer-readable medium of claim 2, wherein the installation package file is modified using information associated with the file path by:

identifying the directory from the download location in which the initial installation package file was stored during the base installation of the current version of the first client application;

moving the installation package file to the directory; and calling the default installer application executable on the client device to perform the silent upgrade using the installation package file as moved.

4. The non-transitory computer-readable medium of claim 1, wherein the unique identifier is a first unique identifier; and further comprising program instructions that, when executed by the client device, cause the client device to:

access the first unique identifier from a property table of the installation package file; and verify that the first unique identifier accessed from the property table of the installation package file matches a second unique identifier for the first client application stored in the registry.

5. The non-transitory computer-readable medium of claim 1, wherein the current version of the first client application is installed on the client device in accordance with an Open Mobile Alliance Device Management (OMA-DM) protocol.

6. The non-transitory computer-readable medium of claim 5, wherein an installation of the current version of the first client application in accordance with the Open Mobile Alliance Device Management (OMA-DM) protocol causes (i) the initial installation package file to have a randomly-generated filename; or (ii) the initial installation package file to be stored in a randomly assigned directory.

7. The non-transitory computer-readable medium of claim 1, wherein the new version of the client application being available more recent than the current version of the client application is identified in response to an execution of the first client application or user input provided during an execution of the first client application on the client device.

8. A computer-implemented method, comprising:

identifying, by a client device, that a new version of a first client application is available that upgrades a current version of the first client application to the new version, wherein the client device comprises at least one hardware processor and the new version being identified by a second client application on the client device, and wherein the new version is required for a state of the client device to be in compliance with at least one compliance rule;

downloading, by the second client application, an installation package file for the new version of the client application;

searching, by the second client application, a registry of an operating system installed on a client device using a unique identifier determined for the first client application to locate information associated with the current version of the client application;

identifying, by the second client application, a file path for the current version of the client application from the registry;

modifying, by the second client application, the installation package file using the information in the registry, wherein the installation package file is modified by performing:

renaming a file name of the installation package file to be the same as a name of an initial installation package file used to install the first client application; and moving the installation package file to a directory in the file path of the current version of the first client application; and generating and executing, by the second client application, a command line query that causes a default installer application executable on the client device to perform a silent upgrade of the first client application, wherein the silent upgrade comprises replacing the current version of the first client application with the new version of the first client application without user interaction.

9. The computer-implemented method of claim 8, wherein the file path is a download location used during a base installation of the current version of the first client application.

10. The computer-implemented method of claim 9, wherein the installation package file is modified using information associated with the file path by:

identifying the directory from the download location in which the initial installation package file was stored during the base installation of the current version of the first client application;

moving the installation package file to the directory; and calling the default installer application executable on the client device to perform the silent upgrade using the installation package file as moved.

11. The computer-implemented method of claim 8, wherein the unique identifier is a first unique identifier; and wherein the computer-implemented method further comprises:

accessing the first unique identifier from a property table of the installation package file; and verifying that the first unique identifier accessed from the property table of the installation package file matches a second unique identifier for the first client application stored in the registry.

12. The computer-implemented method of claim 8, wherein the current version of the first client application is installed on the client device in accordance with an Open Mobile Alliance Device Management (OMA-DM) protocol.

13. The computer-implemented method of claim 12, wherein an installation of the current version of the first client application in accordance with the Open Mobile Alliance Device Management (OMA-DM) protocol causes (i) the initial installation package file to have a randomly-generated filename; or (ii) the initial installation package file to be stored in a randomly assigned directory.

14. The computer-implemented method of claim 8, wherein the new version of the client application being available more recent than the current version of the first client application is identified in response to an execution of the first client application or user input provided during an execution of the first client application on the client device.

15. A system, comprising:
a client device in data communication with a computing environment remotely over a network, wherein the client device comprises at least one hardware processor;
program instructions executable in the client device that, when executed by the client device, cause the client device to:
identify, by a second client application, that a new version of a first client application is available that upgrades a current version of the first client application to the new version, wherein the new version is required for a state of the client device to be in compliance with at least one compliance rule;
download, by the second client application, an installation package file for the new version of the first client application;
search, by the second client application, a registry of an operating system installed on the client device using a unique identifier determined for the first client application to locate information associated with the current version of the first client application from the registry;
identify, by the second client application, a file path for the current version of the client application from the registry;

modify, by the second client application, the installation package file using the information in the registry, wherein the installation package file is modified by performing:
renaming a file name of the installation package file to be the same as a name of an initial installation package file used to install the first client application; and
moving the installation package file to a directory in the file path of the current version of the first client application; and
generate and execute, by the second client application, a command line query that causes a default installer application executable on the client device to perform a silent upgrade of the first client application, wherein the silent upgrade comprises replacing the current version of the first client application with the new version without user interaction.

16. The system of claim 15, wherein the file path is a download location used during a base installation of the current version of the first client application.

17. The system of claim 16, wherein the installation package file is modified using information associated with the file path by:
identifying the directory from the download location in which the initial installation package file was stored during the base installation of the current version of the first client application;
moving the installation package file to the directory; and
calling the default installer application executable on the client device to perform the silent upgrade using the installation package file as moved.

18. The system of claim 15, wherein the current version of the first client application is installed on the client device in accordance with an Open Mobile Alliance Device Management (OMA-DM) protocol.

19. The system of claim 18, wherein an installation of the current version of the first client application in accordance with the Open Mobile Alliance Device Management (OMA-DM) protocol causes (i) the initial installation package file to have a randomly-generated filename; or (ii) the initial installation package file to be stored in a randomly assigned directory.

20. The system of claim 15, wherein the new version of the client application being available more recent than the current version of the client application is identified in response to an execution of the first client application or user input provided during an execution of the first client application on the client device.

* * * * *